(12) United States Patent
Vitt et al.

(10) Patent No.: US 12,291,979 B1
(45) Date of Patent: May 6, 2025

(54) TURBINE ENGINE AND TURBINE NOZZLE

(71) Applicant: GENERAL ELECTRIC COMPANY, Cincinnati, OH (US)

(72) Inventors: Paul Hadley Vitt, Liberty Township, OH (US); Jeffrey Donald Clements, Mason, OH (US); Brian Keith Kestner, Cincinnati, OH (US); Shai Birmaher, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/757,786

(22) Filed: Jun. 28, 2024

Related U.S. Application Data (63) Continuation of application No. 18/494,933, filed on Oct. 26, 2023.

(51) Int. Cl.
*F01D 9/04* (2006.01)

(52) U.S. Cl.
CPC ............ *F01D 9/04* (2013.01); *F05D 2220/32* (2013.01); *F05D 2240/128* (2013.01)

(58) Field of Classification Search
CPC ... F01D 9/04; F05D 2220/32; F05D 2240/128
See application file for complete search history.

(56) References Cited

U.S. PATENT DOCUMENTS

| | | | |
|---|---|---|---|
| 3,722,216 A | 3/1973 | Bahr et al. | |
| 4,448,019 A | 5/1984 | Klees | |
| 5,331,805 A | 7/1994 | Myers et al. | |
| 5,794,432 A | 8/1998 | Dunbar et al. | |
| 6,292,763 B1 | 9/2001 | Dunbar et al. | |
| 6,675,587 B2 | 1/2004 | Graves et al. | |
| 7,374,403 B2 | 5/2008 | Decker et al. | |
| 10,526,894 B1 | 1/2020 | Rose et al. | |
| 2011/0067405 A1 | 3/2011 | Armstrong et al. | |
| 2012/0198810 A1* | 8/2012 | Ansari | F01D 5/141 60/39.5 |
| 2018/0017079 A1* | 1/2018 | Dipietro, Jr. | F04D 25/045 |
| 2020/0200046 A1* | 6/2020 | Stretton | F02C 7/04 |
| 2021/0270136 A1* | 9/2021 | Chouhan | F01D 5/141 |
| 2023/0383654 A1* | 11/2023 | Baralon | F01D 5/021 |

OTHER PUBLICATIONS

Mansouri Zakaria et al., "Heat transfer Characteristics of a high-pressure turbine under combined distorted hot-streak and residual swirl: an unsteady computational study", International Journal of Heat and Mass Transfer, Elsevier, Amsterdam, NL, vol. 195, Jun. 15, 2022 (Jun. 15, 2022).

(Continued)

*Primary Examiner* — Elton K Wong
*Assistant Examiner* — Theodore C Ribadeneyra
(74) *Attorney, Agent, or Firm* — McGarry Bair PC (57) ABSTRACT

A turbine engine includes a core having a fan section, a compressor section, combustion section, and turbine section in serial flow arrangement and defining an engine centerline. The turbine section has a set of turbine stages, having paired sets of non-rotating, circumferentially spaced vanes defining a respective nozzle, and rotating circumferentially spaced blades. A first stage turbine nozzle has a solidity that is a ratio of an axial chord length of the turbine vanes to the circumferential spacing between adjacent vanes.

20 Claims, 5 Drawing Sheets

(56) References Cited

OTHER PUBLICATIONS

Daggett, David L. et al., "Ultra-Efficient Engine Diameter Study" NASA/CR-2003-212309, May 1, 2003 (May 1, 2003), XP093194851, Retrieved from the Internet: URL:http://ntrs.nasa.gov/api/citations/20 030061085/downloads/20030061085.pdf [retrieved on Feb. 20, 2025].

Guynn, Mark D. et al., "Refined Exploration of Turbofan Design Options for an Advanced Single-Aisle Transport," Jan. 1, 2011 (Jan. 1, 2011), pp. 2011-216883, XP055114168, Retrieved from the Internet: URL:http://ntrs.nasa.gov/search.jsp?R=2011 0004165 [retrieved on Feb. 20, 2025].

* cited by examiner

TURBINE ENGINE AND TURBINE NOZZLE

CROSS-REFERENCE TO RELATED APPLICATION(S)

This application claims priority to and the benefit of U.S. patent application Ser. No. 18/494,933, filed Oct. 26, 2023, the entirety of which is incorporated herein by reference.

TECHNICAL FIELD

The disclosure generally relates to a turbine engine, more specifically, to a turbine engine including a turbine nozzle.

BACKGROUND

Turbine engines are rotary engines that extract energy from a flow of working air. The working air passes serially through a compressor section, a combustor section, and a turbine section. The compressor section compresses working air. The combustor section adds fuel to, and ignites, the pressurized air. The turbine section expands and extracts work from the working air to drive the compressor section along with other systems, and provides thrust. The compressor and turbine stages comprise axially arranged pairs of sets of rotating blades and stationary vanes. The sets of rotating blades and stationary vanes are circumferentially arranged about an engine centerline.

A first stage of the turbine section is immediately downstream of the combustor section and includes a first stage turbine nozzle. A consequence of being first is that the first stage turbine nozzle is exposed to the harshest operating environment due to higher absolute temperatures and higher enthalpy flux of the post-combustion working air as compared to other components of the turbine section.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure herein are directed to a gas turbine engine having a plurality of turbine stages. For purposes of illustration, the present disclosure will be described with respect to a gas turbine engine with a turbine section having a set of turbine stages arranged in sequence downstream of a combustor section within the gas turbine engine. Each turbine stage includes a paired set of non-rotating, circumferentially spaced vanes (called a "nozzle") and rotatable, circumferentially spaced blades. While a single turbine stage in the sequence is described and illustrated, it should be understood that aspects can include any integer number of consecutive stages in the turbine section. Further, it will be understood, that aspects of the disclosure herein are not so limited and may have general applicability within an engine, including compressors, as well as in non-aircraft applications, such as other mobile applications and non-mobile industrial, commercial, and residential applications.

Reference will now be made in detail gas turbine engines, one or more examples of which are illustrated in the accompanying drawings. The detailed description uses numerical and letter designations to refer to features in the drawings.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components, unless otherwise noted.

The singular forms "a", "an", and "the" include plural references unless the context clearly dictates otherwise. Furthermore, as used herein, the term "set" or a "set" of elements can be any number of elements, including only one.

The term "fluid" may be a gas or a liquid, or multi-phase. The term "fluid communication" means that a fluid is capable of making the connection between the areas specified.

As used herein, the term "upstream" refers to a direction that is opposite the fluid flow direction, and the term "downstream" refers to a direction that is in the same direction as the fluid flow.

The term "fore" or "forward" means in front of something and "aft" or "rearward" means behind something. For example, with regard to a turbine engine, forward refers to a position closer to an engine inlet and aft refers to a position closer to an engine nozzle or exhaust.

Additionally, as used herein, the terms "radial" or "radially" refer to a dimension away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

The term "overall pressure ratio" (OPR), or overall compression ratio, as used herein, is a ratio of a total pressure immediately downstream of a last stage of a compressor section of a turbine engine to a total pressure immediately upstream of an inlet of the fan section. The OPR can be determined based on a predetermined thrust of the turbine engine, such as a nameplate rated thrust.

The term "airfoil" as used herein, refers to a structure having a cross-sectional shape that provides a reactive aerodynamic force when in motion relative to the surrounding air.

The term "nozzle", as used herein, refers to a set of circumferentially spaced, non-rotating vanes or airfoils, for example of a particular turbine stage or compressor stage.

The term "performance", as used herein, is an ability of a physical part, structure, or system to perform or accomplish an associated action, task, or function. For example, in one particular instance, an aerodynamic performance of a turbine nozzle refers to the relative ability of the turbine nozzle to effectively aerodynamically condition or redirect an axial airflow to a circumferential airflow, and accelerate the airflow toward a rotational speed of a corresponding blade.

The term "chord length", or "CL", as used herein, refers to a straight-line length between a leading edge of an airfoil and a trailing edge of the airfoil.

The term "axial chord length", or "CLa", as used herein, refers to a straight-line length along an axial direction of airflow between the leading edge of the airfoil and the trailing edge of the airfoil.

The term "pitch", or "P", as used herein, refers to a circumferential distance or gap between leading edges of adjacent airfoils. The circumferential distance is measurable at any common radial distance from the engine centerline, but is generally measured at the mid-point of the span of the airfoil.

The term "solidity", or "σ", as used herein, is the ratio of the axial chord length (CLa) to the pitch (P).

The term "NOx Dp/Foo" as used herein is the gaseous emissions mass in grams (Dp) of oxides of nitrogen (NOx) emitted by the gas turbine engine, divided by the rated output (Foo) of the engine in kilonewtons.

The term "Dp/Foo Ratio" (DPFR). Is a ratio of a NOx Dp/Foo value of a new design gas turbine engine to the NOx Dp/Foo value for any predecessor turbine engine.

The term "compressor hub trailing edge radius" (Rc) as used herein is a distance from a last compressor blade hub at a trailing edge of a corresponding blade of a gas turbine engine to a centerline of the engine.

The term "turbine blade leading hub radius" (Rt) as used herein is a distance from a first turbine blade hub at a leading edge of a corresponding blade of a gas turbine engine to a centerline of the engine.

The term "core radius ratio" (CRR) as used herein is a ratio of the turbine blade leading hub radius Rt to the compressor blade hub trailing edge radius Rc, The term "number of turbine stages" (N) is an integer number of sequentially arranged rotor/stator turbine stages of a gas turbine engine.

In certain exemplary aspects of the present disclosure, a gas turbine engine is provided and defines a centerline and a circumferential direction about the centerline. The gas turbine engine includes rotating components that collectively define a rotor assembly, and stationary components that collectively define a stator assembly. In counter-rotating turbine engines, the stator is replaced by a second rotor, which counter-rotates relative to the first rotor. The rotor assembly and the stator assembly in a traditional turbine engine implementation (or the counter-rotating rotors in a counter-rotating implementation) can collectively define an annular airflow path, through which working air passes, relative to the centerline of the gas turbine engine.

Gas turbine engines typically define an engine core, which comprises a compressor section, combustion section, and turbine section in serial flow arrangement along the centerline. The core is contained within a casing or nacelle. The compressor section and turbine section comprise multiple, sequential stages, which are axially arranged along the engine centerline. The stages are arranged in a rotor/stator configuration, in which each stage comprises multiple pairs of a set of circumferentially spaced vanes and a corresponding set of circumferentially spaced blades. The vanes are non-rotating and collectively form a nozzle which fluidly controls the airflow path to the corresponding blades. The blades rotate about the engine centerline.

In the compressor section, each stage in the sequence compresses the working air relative to the prior stage or upstream stage. As the pressurized working air is compressed from stage to stage, the temperature of the pressurized working air increases. The pressurized air from the compressor is supplied to the combustion section for combustion with fuel to generate combustion air, which is fed to the turbine section as the working air. Some of the pressurized air from the compressor section can be bled off from one of the early compressor stages, bypasses the combustion section, and is internally routed to portions of the turbine section. The bleed air may be routed for local cooling, such as film cooling, or injected into the combustion gases just upstream of the turbine section to cool the combustion air by dilution. This compressor cooling air is referred to as bypass cooling air since it bypasses the combustion section and is not used for combustion.

In the turbine section, each stage extracts work from the post-combustion working airflow. The first stage of the turbine section is immediately downstream of the combustion section. The first stage turbine nozzle, being the closest or most proximal turbine stage to the combustion section, encounters the harshest thermal environment. Of any part of the turbine section, the first stage turbine nozzle sees the harshest environment from the post-combustion working air in terms of both absolute temperature and enthalpy flux. For example, the absolute temperature of the post-combustion air can be above the melting point of the material forming the first stage turbine nozzle. The exposure of the first stage turbine nozzle to this harsh environment reduces its durability, especially as compared to other components of the turbine section, including the other stages and the first stage turbine blades, which benefit from a dilution of the combustion gas by cooling air from the compressor that is internally supplied to the first stage turbine nozzle.

To address the consequences of the harsh thermal environment on the first stage turbine nozzle, compressor cooling air is internally routed to the first stage turbine nozzle for cooling, which can include film cooling of the exterior of the first stage turbine nozzle. The compressor cooling air that is used for film cooling is emitted into the working airflow and dilutes the combustion gases exiting the combustor. The addition of the internal compressor cooling air increases the thermal protection and improves the durability of the first stage turbine nozzle, and the dilution of the gas temperature is a benefit to the downstream turbine components. The compressor cooling air used for film cooling is added to the working air as it passes through the first stage turbine nozzle and reduces the enthalpy flux to the turbine downstream of the first stage turbine nozzle.

The first stage turbine nozzle is not used to extract work from the post-combustion working airflow, and is, from a thermodynamic standpoint, treated as part of the combustion section. The temperature of the working airflow at the exit of the first stage turbine nozzle sets the enthalpy available for work extraction by the turbine section. The exit of the first stage turbine nozzle is referred to as the firing plane. The working air temperature at the firing plane is referred to as the firing temperature, which is used to rate the turbine for its potential work extraction. Compressor cooling air introduced upstream of the firing plane is referred to as non-chargeable cooling air. Compressor cooling air introduced downstream of the firing plane is referred to as chargeable cooling air.

In some engines, compressor cooling air is also used in the combustor to control aspects of the combustion process, which can include dilution of the temperature of the gases leaving the combustor. When designing a gas turbine engine, the firing plane temperature is assumed fixed to size the engine. The firing plane temperature sets the available enthalpy for work by the turbine section. The available enthalpy sets the power available for compression and thrust, or shaft power for shaft power turboprop engines. Under a fixed firing plane temperature, multiple upstream factors (e.g., compressor outlet temperature, flame temperature, use of compressor cooling air, configuration of the first stage turbine nozzle, etc.) can impact the firing plane temperature. As one of these factors is altered, it provides for an offsetting or altering of one or more of the other factors to maintain the same firing plane temperature. For example, the first stage turbine nozzle can be modified, which enables changes to other upstream factors, such as an amount of non-chargeable compressor cooling air, to reduce the harshness of the thermal environment of the first stage turbine nozzle, which increases the durability of the first stage turbine nozzle.

The durability of the first stage turbine nozzle competes with the desire for aerodynamic performance. One way to think about the competing desires is via how compressor air is being used as it passes through the engine. The more compressor cooling air diverted to cool the first stage nozzle, the less compressed air combusted, which means less kinetic energy available in the gases exiting the combustor for mechanical work. Thus, reducing first stage turbine nozzle compressor cooling air increases system performance (since less air has to be compressed by the compressor), but at the expense of durability. By reducing the amount of first stage turbine nozzle cooling air, the combustor exit temperature decreases (for a fixed firing plane temperature) since the amount of dilution (e.g., by the film cooling air) inside the nozzle flow path is reduced.

The design dilemma between the choices of a first stage turbine nozzle with enhanced durability vs. aerodynamic performance of the engine is not easily resolved. The inventors have conceived, designed and tested several different types of gas turbine engines having different thrust ratings and/or mission requirements. During this period, several different aspects of an engine architecture must be considered whenever a turbine nozzle is being re-designed. Among those parameters are first stage turbine nozzle solidity, blade length, overall pressure ratio (OPR), combustor type, and compressor bleed. Each can have positive and/or negative impacts on others in terms of design feasibility and penalties that must be accepted in favor of a design change.

Fuel efficiency and aerodynamic performance of the gas turbine engine is at least in part a function of the OPR of the compression section. The OPR is indicative of an amount of compression of the working airflow accomplished by the compressor section and can be expressed as the ratio of a stagnation pressure measured at the rear or downstream end of the compressor section as compared to the stagnation pressure measured at the inlet or upstream end of the fan section. All other things being equal, the greater the OPR, the greater the fuel efficiency of the turbine engine. While increasing the OPR may seem like an easy solution, it is not without its tradeoffs.

For example, to increase the OPR of a turbine engine, the number of stages in a high-pressure compressor (HPC) is increased. The more stages, the higher the OPR. A stage is defined by a fixed row of airfoils (nozzle) that follows or proceeds a rotating set of airfoils. The more stages the greater the OPR. As the gas is compressed further by increasing stages, its temperature also increases, which can impose material-based limits on an achievable compression ratio. The HPC is coupled to a high-pressure turbine (HPT) by a high-pressure shaft or spool.

Increased use of compressor cooling air further reduces fuel efficiency because, as more compressor air bypasses the combustor, there is less compressor air available for combustion, the resulting increase in the fuel-to-air ratio (FAR) raises the combustion flame temperature. Assuming the combustor firing plane temperature is held constant, (i.e., based on a combination of the flame temperature and the compressor cooling air introduced upstream of the firing plane, equals the same firing plane temperature), the first stage turbine nozzle durability decreases with an increase in the flame temperature.

The flame temperature also has an impact on exhaust emissions of the aircraft which can impact local air quality. One of the more difficult exhaust emissions to control are oxides of nitrogen, or nitric oxide (NO), commonly referred to as NOx, and consist of NO and $NO_2$. NOx emissions for aircraft are highly regulated. All commercially available engines are subject to formal, governmental testing, using standard methodologies, which includes tracking the NOx generation of the engine at a given engine thrust. For example, in the U.S., the Fuel venting and Exhaust Emission Requirements for Turbine Powered Airplanes (FAR part 34) guides compliance with the Environmental Protection Agency (EPA) aircraft exhaust emission standards. Internationally, the International Civil Aviation Organization (ICAO) sets emissions standards for jet engines and evaluates the environmental performance of aircraft engines. The ICAO emissions standards address, among other things, gaseous exhaust emissions from jet engines including NOx. The ICAO engine certification process is based on the Landing and Take-off (LTO) cycle. This LTO cycle representing pollutant emissions consists of four operating modes, which involve a thrust setting and a time-in mode. For each thrust setting and corresponding fuel flow, the pollutant emissions are measured in accordance with relevant standards.

A NOx generation value is typically determined for all commercially available engines and conventionally referred to as the "NOx Dp/Foo" value (i.e., the gaseous emissions mass in grams (Dp) of NOx emitted by the gas turbine engine, divided by the rated output (Foo) of the engine in kilonewtons). The NOx Dp/Foo values for production aircraft engines at a specified static thrust, sometimes called "nameplate rated thrust", are indicated in a publicly available International Civil Aviation Organization (ICAO) databank. For example, the ICAO Aircraft Engine Emissions Databank contains information on NOx Dp/Foo values of production turbojet and turbofan engines with a static thrust greater than 26.7 kilonewtons measured according to the procedures in ICAO Annex 16, Volume II.

When evaluating a new engine design, the NOx generation value of the new design will preferably be lower than the NOx generation value for an immediate predecessor or prior generation turbine engine. The NOx generation value of the new design (designated "NOx Dp/Foo$_{new}$") can be compared to the NOx generation value for a predecessor turbine engine (designated "NOx Dp/Foo$_{prior}$"). The DPFR can be expressed as:

$$DPFR = \frac{NO_xD_p}{Foo_{prior}} \bigg/ \frac{NO_xD_p}{Foo_{new}} \quad (1)$$

wherein a DPFR value greater than 1 is indicative of a new design gas turbine engine having an improved NOx emissions (i.e., lower) over the predecessor turbine engine.

NOx emissions tend to be difficult to control because changes in engine design aimed at improving fuel efficiency often make it more challenging to limit NOx production. For example, increased flame temperature has further negative consequences because as the flame temperature increases, there is an increase in NOx emissions from the turbine engine exhaust. NOx emissions are one of the lesser desirable combustion byproducts, which are now regulated, and there is a desire to still further reduce NOx emissions. Since NOx emissions are a function of flame temperature, the NOx emissions can be used as an indicator of flame temperature, since, practically, there is currently no way to directly measure flame temperature.

Overall, there is a desire to reduce flame temperature as it will correspondingly reduce the NOx emissions and reduce the harsh thermal environment seen by the first stage turbine nozzle. Reducing flame temperature could be accomplished by having more compressor airflow through the combustor, which could be accomplished by reducing compressor cooling air to the turbine, which would negatively impact durability, or increasing the capacity of the compressor to create more compressor air, which would negatively impact fuel efficiency. Alternatively, the OPR could be reduced, which would reduce the temperature seen by the first stage turbine nozzle and increase durability, but it would negatively impact fuel efficiency.

There is a complex tradeoff between durability of a first stage turbine nozzle and fuel efficiency of the engine. Factors that would increase durability (e.g., reducing OPR, reducing flame temperature, or increasing bypass cooling air) tend to decrease aerodynamic performance. A design dilemma is how to arrive at a desired durability of the first stage turbine nozzle without sacrificing aerodynamic performance.

Figure 1:
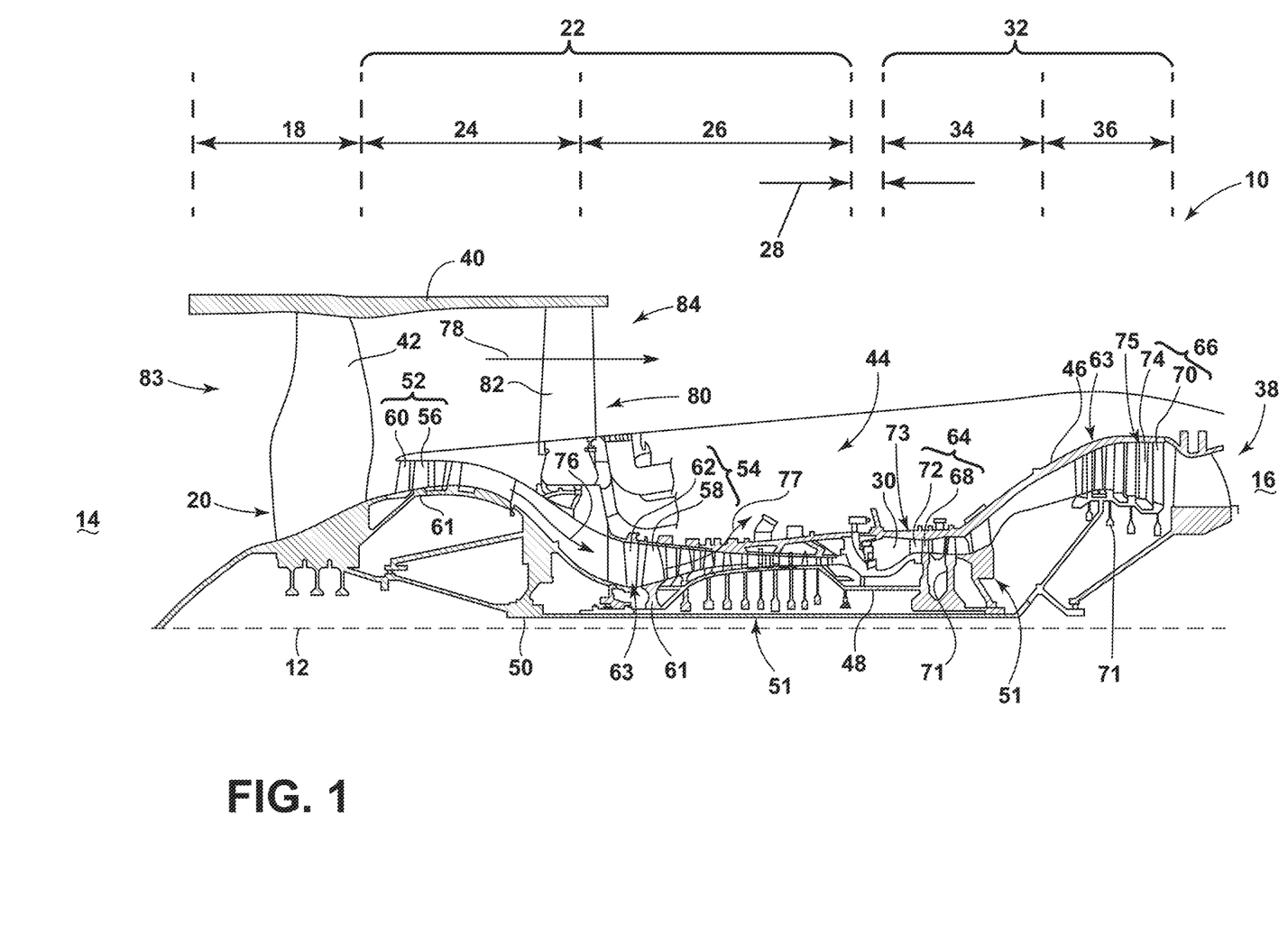
FIG. 1 is a schematic cross-sectional view of a turbine engine according to an exemplary aspect of the present disclosure.

Exemplary solutions to this design dilemma are provided in the following examples, which are illustrated in the context of a turbine engine as shown in the schematic of FIG. 1. The turbine engine 10, as described herein, is meant as a non-limiting example, and other architectures are possible, such as, but not limited to, a steam turbine engine, a supercritical carbon dioxide turbine engine, or any other suitable turbine engine.

FIG. 1 is a schematic cross-sectional diagram of a gas turbine engine 10 for an aircraft. The gas turbine engine 10 has a generally longitudinally extending axis or engine centerline 12 extending forward 14 to aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. A fan inlet 83 of the fan section 18 is defined at the upstream or forward end 14 of the gas turbine engine 10. A fan exhaust 84 is defined at the downstream end of the fan casing 40. The HP compressor 26, the combustor 30, and the HP turbine 34 form a core 44 of the gas turbine engine 10, which generates combustion gases. The engine core 44 is surrounded by a core casing 46, which can be coupled with the fan casing 40.

A HP shaft or spool 48 disposed coaxially about the engine centerline 12 of the gas turbine engine 10 drivingly connects the HP turbine 34 to the HP compressor 26. A LP shaft or spool 50, which is disposed coaxially about the engine centerline 12 of the gas turbine engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a compressor disk 61, which is mounted to the corresponding one of the HP and LP spools 48, 50, with each stage having its own compressor disk 61. The blades 56, 58 may be part of a blisk, rather than being mounted to a disk. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding nozzle 73, 75 including respective sets of static turbine vanes 72, 74, to extract energy from the stream of fluid passing through the turbine stage 64, 66. In a single turbine stage 64, 66, multiple turbine blades 68, 70 can be provided in a ring and can extend radially outwardly relative to the engine centerline 12, from a blade platform to a blade tip, while the corresponding turbine vanes 72, 74 are positioned upstream of and adjacent to the rotating turbine blades 68, 70. The turbine blades 68, 70 and the turbine vanes 72, 74 can be airfoil shaped. It is noted that the number of blades, vanes, and turbine stages shown in FIG. 1 were selected for illustrative purposes only, and that other numbers are possible.

The turbine blades 68, 70 for a stage of the turbine can be mounted to a turbine disk 71, which is mounted to the corresponding one of the HP and LP spools 48, 50, with each stage having a dedicated turbine disk 71. The vanes 72, 74 for a stage of the compressor can be mounted to the core casing 46 in a circumferential arrangement.

Complimentary to the rotor portion, the stationary portions of the gas turbine engine 10, such as the vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bypass cooling air 77. The bypass cooling air 77 can be drawn from the pressurized airflow 76 and provided to engine components requiring cooling. The temperature of pressurized airflow 76 entering and exiting the combustor 30 is significantly increased. As such, cooling provided by the bypass cooling air 77 is supplied to downstream turbine components (e.g., a blade 68) being subjected to the heightened temperature environments.

A remaining portion of the airflow exiting the fan section, called a bypass airflow 78, bypasses the LP compressor 24 and engine core 44 and exits the gas turbine engine 10 through a stationary vane row, and more particularly an outlet guide vane assembly 80, comprising a plurality of airfoil guide vanes 82, at the fan exhaust 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32. The HP turbine 34 is the hottest portion as it is directly downstream of the combustion section 28. Other sources of cooling fluid can be, but are not limited to, fluid discharged from the LP compressor 24 or the HP compressor 26.

Figure 2:
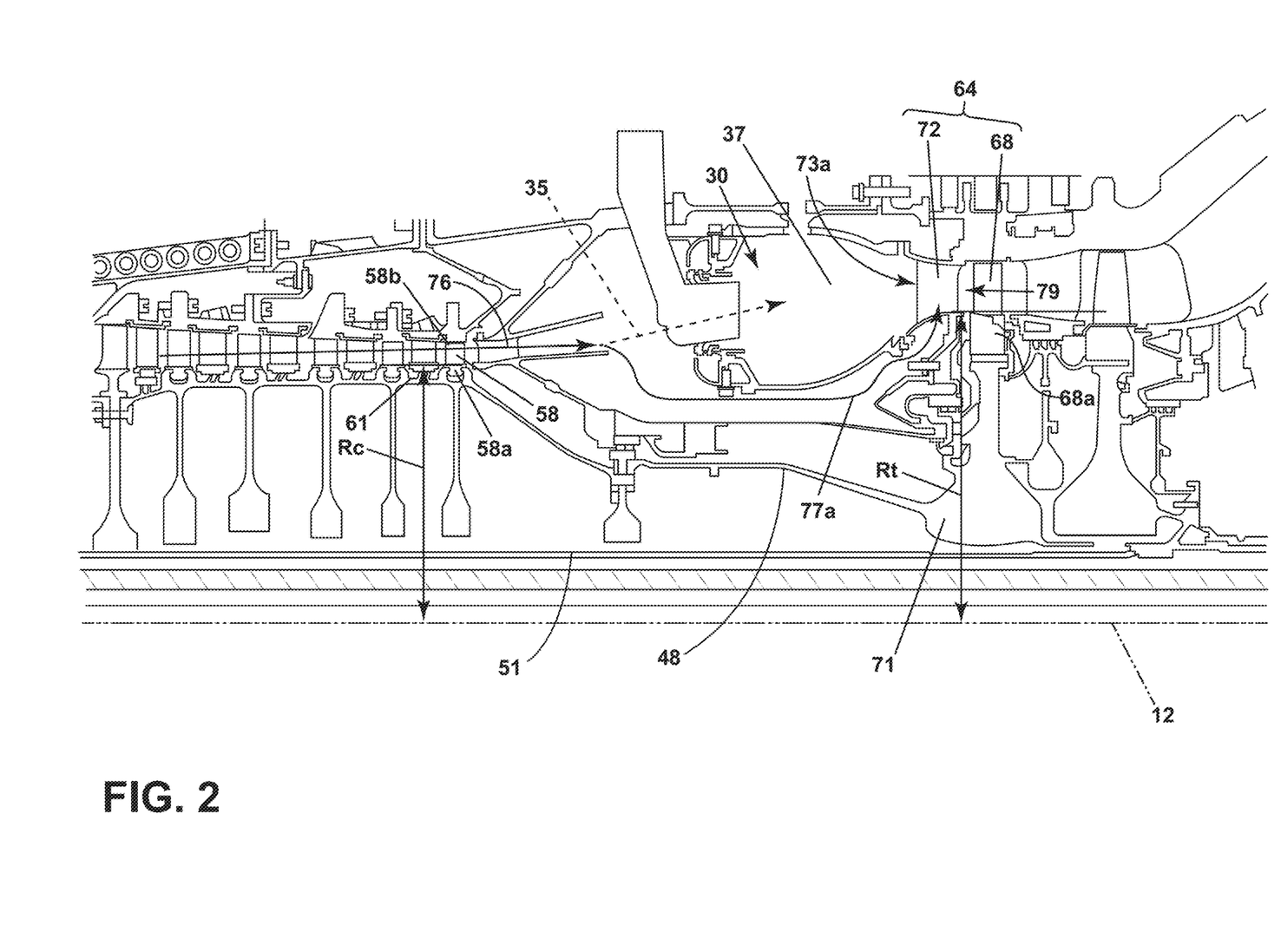
FIG. 2 is a schematic cross-sectional view illustrating a portion of the turbine engine according to an exemplary aspect of the present disclosure.

FIG. 2 is a schematic cross-sectional diagram illustrating a detail portion of a turbine engine in accordance with a non-limiting aspect, including the combustion section 28, the trailing or downstream end of the HP compressor section 22, and the leading or upstream end of the turbine section 32. As shown, the combustion section 28 is arranged downstream from the compressor section 22 to receive the pressurized airflow 76. The last or most downstream HP compressor stage 54 of the HP compressor 26 includes a respective set of compressor blades 58 coupled at a blade platform or hub 58a to the compressor disk 61. The set of compressor blades 58 extend radially outward relative to the engine centerline 12, to a blade tip 58b. As shown, the compressor hub trailing edge radius (Rc) is the distance from the last compressor blade hub 58a at a trailing edge of a corresponding compressor blade 58 to the engine centerline 12.

The turbine section 32 is arranged downstream from the combustion section 28 in order to receive the pressurized airflow 76 (including combustion gases) at a combustor outlet or exit 37. The first or most upstream HP turbine stage 64 of the turbine section 32 includes a first stage turbine nozzle 73a. The first stage turbine nozzle 73a is the most upstream turbine nozzle 73 and is disposed radially about the engine centerline 12. As such, the first stage turbine nozzle 73a is the closest turbine nozzle 73 to the combustion section 28. The first stage turbine nozzle exit 79, also referred to herein as the firing plane, is upstream of the corresponding first set of turbine blades 68. The first set of turbine blades 68 are coupled at a first turbine blade platform or hub 68a to the turbine disk 71 of the first HP turbine stage 64. A distance from the first turbine blade hub 68a at a leading edge of a corresponding turbine blade 68 to the engine centerline 12 defines a turbine blade leading hub radius (Rt).

As illustrated, the ratio of the turbine blade leading hub radius Rt to the last compressor blade hub 58a trailing edge radius Rc, defines the core radius ratio CRR. The CRR can thus be expressed as:

$$CRR = Rt/Rc \qquad (2)$$

In operation, a portion of the pressurized airflow 76 from the HP compressor 26 is supplied to the combustion section 28 for combustion with fuel (not shown) to generate combustion air (indicated as dashed arrow 35), which is fed to the turbine section 32 as the pressurized airflow 76. Some of the bypass cooling air 77a can be provided to portions of the turbine section 32 (e.g., to the first stage turbine nozzle 73a) for local cooling, such as film cooling, or injected into the combustion air 35 just upstream of the turbine section 32 to cool the combustion air 35 by dilution.

The temperature of the air at the first stage turbine nozzle exit 79 (i.e., the firing plane), can be determined at least in part by the temperature of the pressurized airflow 76, which includes the combustion air 35 from the combustor 30 and the temperature and volume of the bypass cooling air 77a provided to the first stage turbine nozzle 73a.

Figure 3:
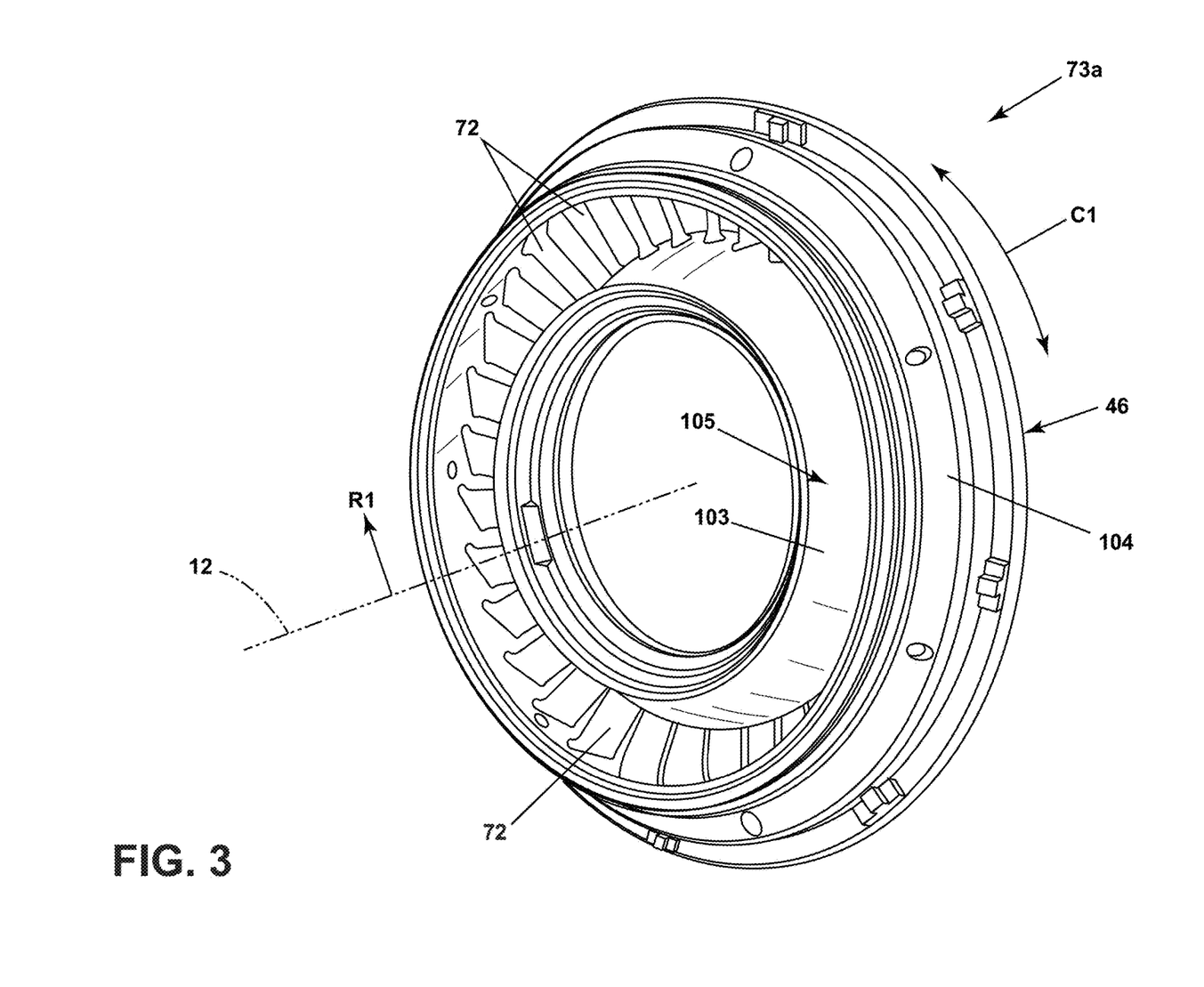
FIG. 3 is a perspective view of an exemplary first stage turbine nozzle, illustrating a general structure in which an aspect of the present disclosure can be implemented.

FIG. 3 illustrates a perspective view of the first stage turbine nozzle 73a, with other portions of the turbine section 32 omitted for clarity. The first stage turbine nozzle 73a is disposed radially about the engine centerline 12 and generally defines a radial direction R1 and a circumferential direction C1.

The first stage turbine nozzle 73a can include an annular outer band 104 or wall that is spaced apart from an annular inner band 103 or wall along the radial direction R1 to define an annular airflow passage 105 surrounding the engine centerline 12. The first stage turbine nozzle 73a includes a respective set of turbine vanes 72. The set of turbine vanes 72 are circumferentially spaced with respect to each other about the first stage turbine nozzle 73a within the airflow passage 105 and extend radially outward between the inner band 103 and outer band 104. Each turbine vane 72 is coupled at a radially inner end (root) to the inner band 103, and further coupled at an opposing radially outer end (tip) to the outer band 104.

Figure 4:
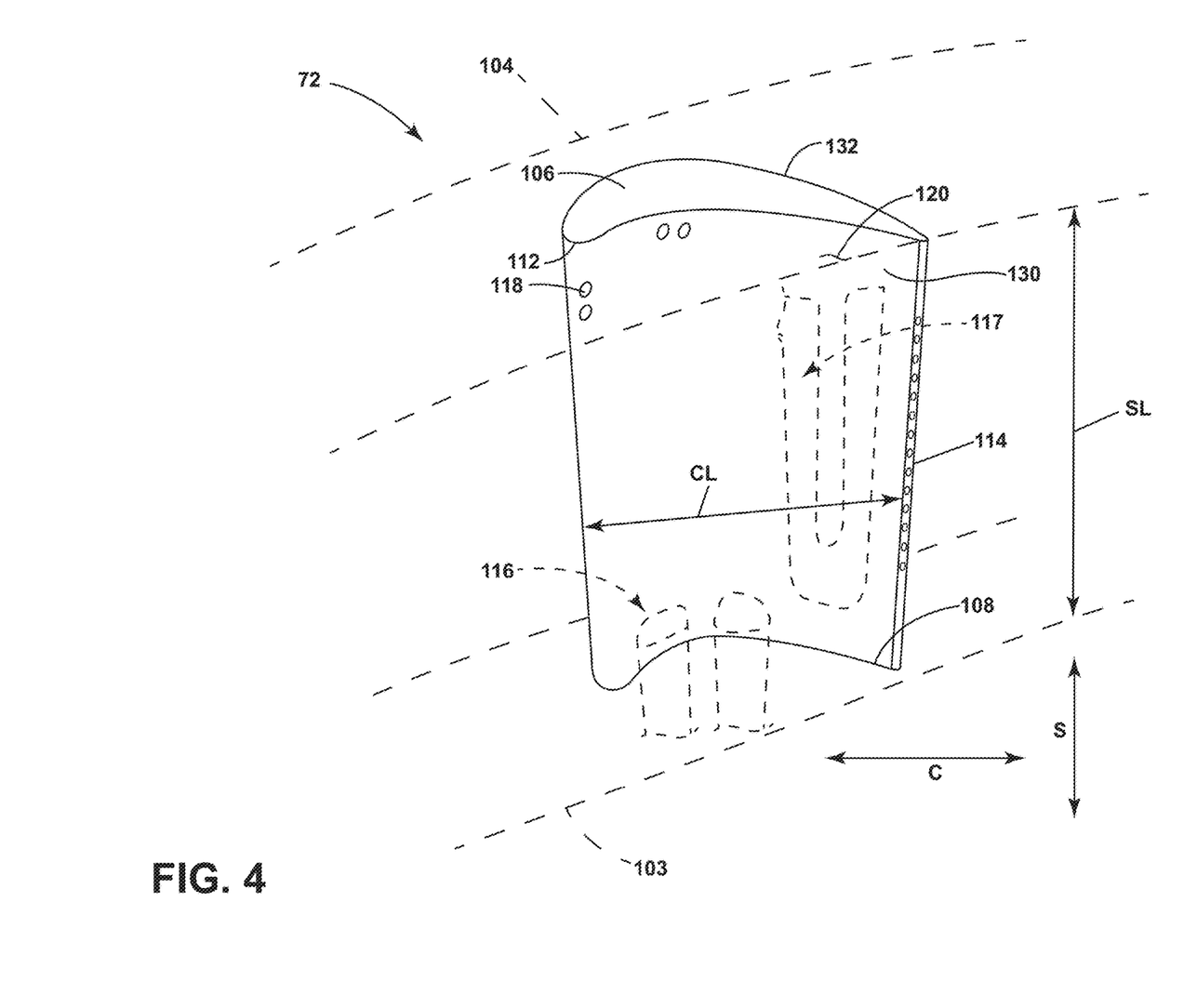
FIG. 4 is a schematic diagram of a vane assembly according to an exemplary aspect of the present disclosure.

FIG. 4 is a schematic of an exemplary turbine vane 72 which can be in the shape of an airfoil. The turbine vane 72 includes an outer wall 120, which defines a pressure side 130 and a suction side 132. The outer wall 120 defines an entirety of an exterior of the turbine vane 72 along the pressure side 130 and the suction side 132. The outer wall 120 extends between a leading edge 112 and a trailing edge 114 to define a chord-wise dimension (denoted "C"), and also extends radially between a root 108 and a tip 106 to define a span-wise dimension (denoted "S"). A span length (denoted "SL") is defined as the total length or height of the turbine vane 72 in the span-wise direction S from the root 108 to the tip 106. As illustrated, the chord length CL of the turbine vane 72 is the straight-line distance along the chordwise direction C between the leading edge 112 and the trailing edge 114. Because of the angular orientation of the airfoil shape of the turbine vane 72 relative to the engine centerline (FIG. 1) and the camber of the airfoil, the chord-wise direction generally is not parallel to the engine centerline.

The turbine vane 72 can be coupled to the annular inner band 103 (illustrated in dashed line) at the root 108 and to the annular outer band 104 (illustrated in dashed line) at the tip 106. A set of inlet passages 116, exemplarily shown as two inlet passages, can provide a path for communication for a fluid flow (e.g., bypass cooling air 77) to enter the turbine vane 72 from at least one of the annular inner band 103 or the annular outer band 104. Additionally, at least one cooling supply conduit 117 can be disposed within the turbine vane 72 and fluidly coupled to any one of the set of inlet passages 116.

A set of cooling holes 118 can extend through the outer wall 120. The cooling holes 118 are illustrated as being placed in various locations along the outer wall 120. The set of cooling holes 118 can be placed along the leading edge 112, the trailing edge 114, at the root 108 of the turbine vane 72, or near the tip 106 of the turbine vane 72. The set of cooling holes 118 can be located on the pressure side 130 or the suction side 132. The set of cooling holes 118 can be any number of cooling holes, where each cooling hole is fluidly coupled to the inlet passages 116 to cool the outer wall 120.

Figure 5:
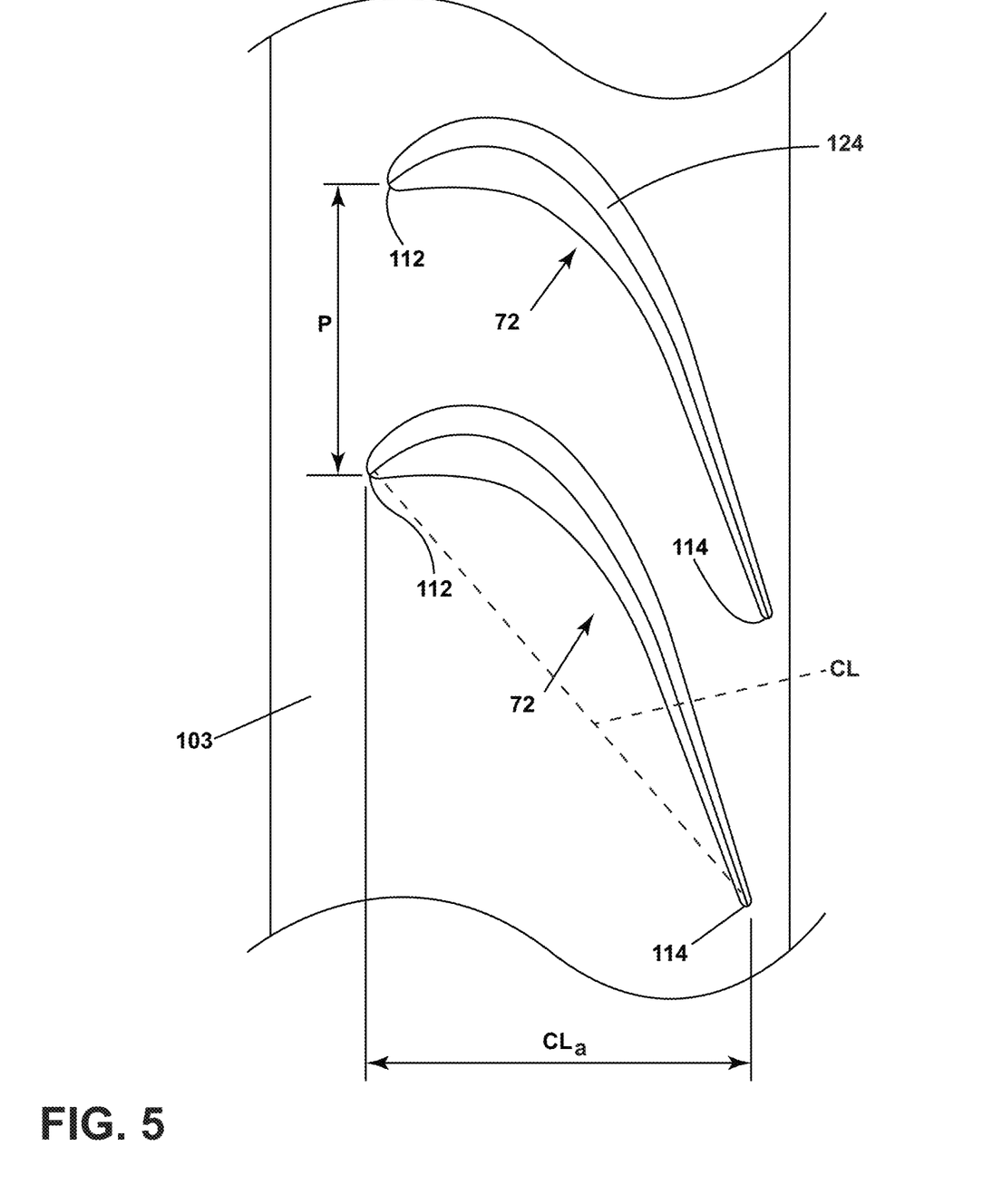
FIG. 5 is a cross-section top-down view of a portion of the first stage turbine nozzle of FIG. 3, illustrating two vanes or airfoils according to an exemplary aspect of the present disclosure.

FIG. 5 is a cross-section top-down view of a portion of the first stage turbine nozzle 73a of FIG. 3. As shown, each turbine vane 72 can be defined by a profile 124 that influences efficiency characteristics. The profile 124 can be the same at the root 108 (FIG. 3) as it is at the tip 106 (FIG. 3). Alternatively, the profile 124 can be different at the root 108 than it is at the tip 106.

In non-limiting aspects, in the illustrated highly-cambered airfoil shape of the turbine vane 72, a majority of the chord length CL does not lay within the profile 124, but instead extends through the pressure side 130 area of the turbine vane 72.

Alternatively, none of, all of, or any fraction of the chord length CL may lay within the profile 124. In non-limiting aspects, each turbine vane 72 can have the same axial chord length CLa as the other turbine vanes 72 in the first stage turbine nozzle 73a. In other aspects, one or more of the turbine vanes 72 in the first stage turbine nozzle 73a can have a different axial chord length CLa than other turbine vanes 72 in the first stage turbine nozzle 73a. In such cases, the axial chord length CLa for the first stage turbine nozzle 73a can be calculated, for example as an average or representative axial chord length CLa value for the turbine vanes 72 of the first stage turbine nozzle 73a. In one non-limiting aspect, a representative axial chord length CLa for a first stage turbine nozzle 73a including the turbine vanes 72 having different respective axial chord lengths CLa can be calculated by determining the axial chord length CLa of each turbine vane 72 in the first stage turbine nozzle 73a, and then determining an average axial chord length CLa value for the turbine vanes 72 in the first stage turbine nozzle 73a.

In non-limiting aspects, the pitch P between adjacent turbine vanes 72 is constant throughout the first stage turbine nozzle 73a. In other aspects, the pitch P can vary between adjacent turbine vanes 72. A representative pitch P for a first stage turbine nozzle 73a having a non-constant distance between adjacent turbine vanes 72 can be calculated by determining a radial mid-point of each of the turbine vanes 72 along the respective leading edge 112, determining a radial mid-point circumference of the first stage turbine nozzle 73a defined by the determined radial mid-points of the turbine vanes 72, and dividing the determined radial mid-point circumference by the number of turbine vanes 72 in the first stage turbine nozzle 73a.

The determined pitch P and the axial chord length CLa values for the first stage turbine nozzle 73a together determine the solidity σ of the first stage turbine nozzle 73a. That is, the solidity σ of the first stage turbine nozzle 73a is defined by the ratio of the axial chord length CLa to the pitch P:

$$\sigma = \frac{CL_a}{P} \qquad (3)$$

The solidity σ of the first stage turbine nozzle 73a can be reduced by increasing the circumferential pitch P (e.g., by reducing the number of turbine vanes 72), or by reducing the axial chord length CLa of the turbine vanes 72, or both. Reducing the solidity σ of the first stage turbine nozzle 73a leads to less total vane surface area and corners. More total vane surface area can retain more heat and require additional compressor cooling airflow.

As solidity σ decreases, less non-chargeable cooling air is needed because there is less surface area to cool. In addition, more compressor air can be channeled through the combustor. More compressor air through the combustor lowers the combustor exit temperature (for a fixed fuel flow and/or fixed firing plane temperature), which reduces the harshness of the thermal environment seen by the first stage turbine nozzle 73a.

Reducing the solidity σ of the first stage turbine nozzle 73a can reduce pressure losses and increase overall aerodynamic performance. However, reducing the solidity σ of the first stage turbine nozzle 73a beyond certain limits can reduce the aerodynamic performance of the first stage turbine nozzle 73a via higher aerodynamic losses in the passages between turbine vanes 72.

In order for the first turbine stage 64 to produce the required power, the first stage turbine nozzle 73a needs to pre-condition the incoming pressurized airflow 76 by accelerating the pressurized airflow 76 at the combustor exit 37 to a relatively high Mach number (for example, around 0.9) with high angular momentum suitable for the anticipated rotational speed of the blades 68. The blades 68 then extract work from that high angular momentum.

If the first stage turbine nozzle 73a vane solidity σ is reduced by reducing the number of turbine vanes 72, there are fewer turbine vanes 72 to produce the angular momentum. Further, as solidity σ decreases, whether by reducing the number of turbine vanes 72, or by reducing the axial chord length CLa, or both, the turbine vanes 72 can become overloaded, not function as an airfoil, and fail to produce the correct angular momentum in the working airflow.

The inventors found the CRR relates to the ability of the turbine section 32 as a whole, and the first stage turbine nozzle 73a in particular, to be effectively cooled by the bypass cooling air 77a while maintaining required aerodynamic performance and fuel efficiency of the engine. The inventors discovered that there is a tradeoff between aerodynamic performance and durability of the turbine vanes 72 and blades 68 in the first HP turbine stage 64 due to the relationship of the length of the turbine vanes 72 and blades 68, and the amount of bypass cooling air 77a provided to the first stage turbine nozzle 73a.

For example, as the turbine vanes 72 become taller, by increasing the span length SL (i.e., decreasing the CRR), the vanes become more difficult to cool due to their inherent additional surface area. That is, taller turbine vanes 72 will be less durable unless the bypass cooling air 77a to the vanes is increased. To maintain durability D for taller turbine vanes 72, additional bypass cooling air 77a can be bled off from the pressurized airflow 76 and routed to the turbine vanes 72 to provide an adequate heat sink to protect the material forming the turbine vanes 72 from overheating. However, for a fixed firing plane temperature, reducing the pressurized airflow 76 by bleeding off more bypass cooling air 77a to cool the turbine vanes 72 results in increased flame temperatures in the combustor 30. The increased flame temperatures create an adverse thermal environment that can result in reduced durability of the first stage turbine nozzle 73a and reduced aerodynamic performance of the turbine engine 10.

Conversely, as the turbine vanes 72 become shorter, by decreasing the span length SL while keeping the airflow passage 105 dimensions fixed, (i.e., increasing the CRR), the turbine vanes 72 become easier to cool due to their inherent decreased surface area. That is, shorter turbine vanes 72 will be more durable with decreased span length SL.

With the foregoing in mind, the inventors sought to find a desired trade-off between durability of the first stage turbine nozzle 73a, and operational performance of the engine while satisfying all mission/performance requirements for the architecture. It was desirable to yield a more durable first stage turbine nozzle 73a without sacrificing fuel efficiency, and operational performance, or exceeding a permissible Nox emission requirement of the gas turbine engine. As described in more detail below, the inventors determined, based on the conclusions reached after evaluating different engine configurations, interdependent relationships exist among various parameters, including the number N of turbine stages, solidity σ, OPR, CRR, and DPFR values, in those embodiments that exhibited the sought-after trade-off between aerodynamic performance and durability of a turbine nozzle.

The inventors conceived, tested, and evaluated several numbers of, and different types of, engine configurations. Each engine configuration may have various different mission and performance requirements. Each engine configuration included a number "N" of turbine stages, solidity σ, an overall pressure ratio OPR, a core radius ratio CRR, and a DPFR value. While some of the different engine configurations exhibited the sought-after trade-off between aerodynamic performance and durability of a turbine nozzle, not all did. A partial listing of values corresponding to different engine configurations including certain embodiments that exhibited the sought-after trade-off between aerodynamic performance and durability of a turbine nozzle is shown in TABLE 1.

TABLE 1

| DPFR | Solidity | N | OPR | CRR |
|---|---|---|---|---|
| 0.8 | 0.2 | 2 | 20 | 0.9 |
| 1 | 0.2 | 2 | 30 | 1 |
| 1.2 | 0.2 | 2 | 40 | 1.1 |
| 1.6 | 0.2 | 2 | 50 | 1.2 |
| 2 | 0.2 | 2 | 60 | 1.3 |
| 0.8 | 0.3 | 2 | 20 | 0.9 |
| 1 | 0.3 | 2 | 30 | 1 |
| 1.2 | 0.3 | 2 | 40 | 1.1 |
| 1.6 | 0.3 | 2 | 50 | 1.2 |
| 2 | 0.3 | 2 | 60 | 1.3 |
| 0.8 | 0.4 | 2 | 30 | 1.1 |
| 1 | 0.4 | 2 | 40 | 1.2 |
| 1.2 | 0.4 | 2 | 50 | 1.3 |
| 1.6 | 0.4 | 2 | 60 | 0.9 |
| 2 | 0.4 | 2 | 20 | 1 |
| 0.8 | 0.6 | 2 | 40 | 1.3 |
| 1 | 0.6 | 2 | 50 | 0.9 |
| 1.2 | 0.6 | 2 | 60 | 1 |
| 1.6 | 0.6 | 2 | 20 | 1.1 |
| 2 | 0.6 | 2 | 30 | 1.2 |
| 0.8 | 0.8 | 2 | 50 | 1 |
| 1 | 0.8 | 2 | 60 | 1.1 |
| 1.2 | 0.8 | 2 | 20 | 1.2 |
| 1.6 | 0.8 | 2 | 30 | 1.3 |
| 2 | 0.8 | 2 | 40 | 0.9 |
| 0.8 | 1 | 2 | 60 | 1.2 |
| 1 | 1 | 2 | 20 | 1.3 |
| 1.2 | 1 | 2 | 30 | 0.9 |
| 1.6 | 1 | 2 | 40 | 1 |
| 2 | 1 | 2 | 50 | 1.1 |
| 2 | 0.4 | 1 | 20 | 1 |
| 2 | 0.6 | 1 | 30 | 1.2 |

During this extensive and time-consuming analysis, the inventors discovered interdependent relationships as described below that enable the balance needed to satisfy durability while maintaining aerodynamic performance.

For example, the inventors determined that within a certain, limited range of acceptable reductions in a solidity σ of a first stage turbine nozzle 73a, there results an unexpected increase in the durability of the nozzle 73a without significant penalty in aerodynamic performance. The inventors determined that a reduction in the solidity σ of the first stage turbine nozzle 73a of satisfactory new designs can result in an increase in the durability without unacceptable penalties.

The inventors also found the durability of satisfactory new designs of the first stage turbine nozzle 73a can have a positive correlation to CRR. The inventors further discovered a relationship between the durability of the turbine section and the OPR of the engine. As the engine OPR is increased, which typically increases system performance, the compressor exit temperature increases, which in turn reduces the heat sink capacity of the cooling air supplied to the turbine, reducing the durability of the turbine. In their discovery, the inventors found the durability of the first stage turbine nozzle 73a of satisfactory new designs has a positive correlation to a ratio of the integer number of turbine stages N and the OPR of the engine.

The inventors were able to quantify the discovered relationship amongst the parameters for the embodiments that exhibited the sought-after trade-off between aerodynamic performance and durability of a turbine nozzle. The unexpectedly discovered relationship was found by identifying certain features, including those discussed above, common among the different engine architectures that provided the desired trade between performance and durability. The inventors call it the nozzle Durability Performance Index (denoted "DPI") and expressed as:

$$DPI = \sqrt{\frac{1}{\sigma}} * \sqrt{DPFR} * (1.275 * N \div OPR^{0.275}) *$$
$$(1 - 3 * (\sigma - 0.6)^2) * \sqrt{(CRR)} \quad (3)$$

This DPI expression can be simplified to:

$$DPI = \sqrt{[CRR * DPFR / \sigma]} * \left[\frac{1.275 * N}{OPR^{0.275}}\right] * \left[1 - 3 * (\sigma - 0.6)^2\right] \quad (4)$$

For example, TABLE 2, below, illustrates the DPI values for the engine configurations of TABLE 1.

TABLE 2

| DPFR | Solidity | N | OPR | CRR | DPI |
|---|---|---|---|---|---|
| 1.2 | 0.2 | 2 | 40 | 1.1 | 1.235 |
| 1.6 | 0.2 | 2 | 50 | 1.2 | 1.401 |
| 2 | 0.2 | 2 | 60 | 1.3 | 1.550 |
| 0.8 | 0.3 | 2 | 20 | 0.9 | 1.265 |
| 1 | 0.3 | 2 | 30 | 1 | 1.333 |
| 1.2 | 0.3 | 2 | 40 | 1.1 | 1.415 |
| 1.6 | 0.3 | 2 | 50 | 1.2 | 1.605 |
| 2 | 0.3 | 2 | 60 | 1.3 | 1.777 |
| 0.8 | 0.4 | 2 | 30 | 1.1 | 1.306 |
| 1 | 0.4 | 2 | 40 | 1.2 | 1.409 |
| 1.2 | 0.4 | 2 | 50 | 1.3 | 1.511 |
| 1.6 | 0.4 | 2 | 60 | 0.9 | 1.380 |
| 2 | 0.4 | 2 | 20 | 1 | 2.201 |
| 0.8 | 0.6 | 2 | 40 | 1.3 | 1.217 |
| 1.6 | 0.6 | 2 | 20 | 1.1 | 1.916 |
| 2 | 0.6 | 2 | 30 | 1.2 | 2.001 |
| 1.2 | 0.8 | 2 | 20 | 1.2 | 1.320 |
| 1.6 | 0.8 | 2 | 30 | 1.3 | 1.420 |
| 2 | 0.8 | 2 | 40 | 0.9 | 1.220 |
| 2 | 0.2 | 2 | 20 | 0.9 | 1.745 |
| 2 | 0.4 | 1 | 20 | 1 | 1.100 |
| 2 | 0.6 | 1 | 30 | 1.2 | 1.001 |

The inventors determined that when compared to prior art designs, the exemplary gas turbine engines having a DPI greater than 1.001 and less than 2.201 exhibited a more durable first stage turbine nozzle 73a while maintaining satisfactory aerodynamic performance. Furthermore, in addition to increased durability of the first stage turbine nozzle 73a, the illustrated exemplary aspects can unexpectedly provide improved engine performance, for example a reduced Nox emissions (as indicated by a DPFR greater than 1) over prior engines having the same power output.

TABLE 3, below, provides the ranges of parameter values for gas turbine engines exhibiting the sought-after trade-off between aerodynamic performance and durability of a turbine nozzle. When the engine under consideration has features that fall within these ranges and result in DPI within the desired range (as discussed above), then it indicates a durability improvement for the first stage turbine nozzle 73a itself and performance improvements discussed earlier.

TABLE 3

| Parameter | First Range | Second Range | Third Range |
|---|---|---|---|
| DPI | 1.001-2.201 | 1.217-2.201 | 1.001-1.1000 |
| σ | 0.2-0.8 | 0.2-0.8 | 0.4-0.6 |
| DPFR | 0.8-2.0 | 0.8-2.0 | 2 |
| OPR | 20-60 | 20-60 | 20-30 |
| CRR | 0.9-1.3 | 0.9-1.3 | 1.0-1.2 |
| N | 1-2 | 2 | 1 |

It was further discovered, unexpectedly, by the inventors, that a first stage turbine nozzle 73a having an improved durability over prior designs where the first stage turbine nozzle 73a to has a solidity σ that lies within a range between 0.2 and 0.8, inclusively (i.e., 0.2≤σ≤0.8). The inventors found a high aerodynamic performance in satisfactory designs having a solidity σ of 0.8. The inventors further found the aerodynamic performance would diminish as solidity σ was decreased. However, the inventors found that a reduction in aerodynamic performance was offset by increases in the durability of the first stage turbine nozzle 73a within the limited ranges given above. Designs having the first stage turbine nozzle 73a with a solidity σ in the range between 0.2 and 0.8, inclusive, was determined by the inventors to provide satisfactory durability and aerodynamic performance.

Finding a workable solution that balances durability of the first stage turbine nozzle and the fuel efficiency performance of the gas turbine engine is a labor-intensive and time-intensive process, because the process is iterative and involves the balancing of interdependent variable parameters. Design procedures frequently require placing the first stage turbine nozzle 73a (FIG. 2) into a gas turbine engine 10 (FIG. 1) designed for specific performance parameters within an acceptable range and evaluating a durability of the first stage turbine nozzle 73a based on a particular set of those performance parameters. Evaluating whether the durability of the first stage turbine nozzle 73a is positively or negatively affected by operation of the turbine engine 10 based on other performance parameters within the acceptable range, is time-intensive. In some cases, this may even result in a re-design of the first stage turbine nozzle 73a and gas turbine engine 10 if predetermined performance parameters (e.g., durability, fuel efficiency, and the like) for the new gas turbine engine 10 are not met. It is desirable to have an ability to arrive at an improved first stage turbine nozzle 73a, rather than relying on chance or extensive experimentation. It would be desirable to have a limited or narrowed range of possible first stage turbine nozzle 73a configurations that meet improved durability requirements, while also meeting predetermined design parameters of the engine, such parameters including DPFR, OPR, CRR, solidity and performance parameters such as Nox emissions.

Knowing these trade-offs and relationships is a desirable time saver. Moreover, utilizing the above-described relationships and DPI equation, the inventors found that the number of suitable or feasible first stage turbine nozzle possibilities for placement in a turbine engine that is capable of meeting the design requirements could be greatly reduced, thereby facilitating a more rapid down-selection of turbine nozzles to consider as an engine is being developed. Such benefit provides more insight to the requirements for a given engine long before specific technologies, integration, or system requirements are developed fully.

Other benefits associated with the DPI described herein may include a preliminary assessment of design parameters in terms of the first stage turbine nozzle. Further, the DPI described herein enables an early visualization of tradeoffs in terms of various geometries that are bounded by the constraints imposed by the materials used, the available space in the turbine engine, the type of turbine engine or number of stages, or any other design constraint. The DPI enables the manufacturing of a high performing turbine engine with the factors available. While narrowing these multiple factors to a region of possibilities saves time, money, and resources, the largest benefit is at the system level, where the turbine nozzle described herein enables improved system performance. Previously developed turbine nozzles may peak in one area of performance by design, but lose efficiency or lifetime benefits in another area of performance. In other words, the DPI enables the development and production of higher performing turbine engines across multiple performance metrics within a given set of constraints. The improved turbine nozzle designs defined by the DPI account for these factors and desirable outcomes.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable a person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine comprising: a core including a fan section, a compressor section, a combustion section, and a turbine section in serial flow arrangement, the core defining an engine centerline; the compressor section including a set of compressor stages, the set of compressor stages including a first compressor stage and a last compressor stage, each of the set of compressor stages comprising a pair of non-rotating vanes and rotating blades, wherein an overall pressure ratio (OPR) defined as a ratio of a total pressure immediately downstream of the last compressor stage to a total pressure immediately upstream of an inlet of the fan section, wherein the OPR is in a range of 20-60; the turbine section including a set of turbine stages having a number of turbine stages (N) in a range of 1-2, each turbine stage comprising pairs of non-rotating vanes and rotating blades, wherein a set of vanes defines a nozzle, and wherein a first stage turbine nozzle is closest to the combustion section; wherein the first stage turbine nozzle has a solidity ($\sigma$) defined as a ratio of an axial chord length of a first stage vane to a circumferential spacing between adjacent vanes of the first stage turbine nozzle, wherein the solidity is in a range of 0.2-0.8; wherein the turbine engine has a Nox Dp/Foo ratio (DPFR) defined as a ratio of a Nox Dp/Foo of a predecessor turbine engine to the Nox Dp/Foo of the turbine engine, wherein the DFPR is in a range of 0.8-2.0; wherein the turbine section and compressor section define a core radius ratio (CRR), the CRR defined as a ratio of Rt/Rc, where Rt is a radius defined by the first turbine stage and Rc is a radius defined by the last compressor stage, wherein the CRR is in a range of 0.9-1.3; and wherein the first stage turbine nozzle having a durability and performance index (DPI) defined as: DPI=$\sqrt{(CRR*DPFR)/\sigma*[(1.275*N)/⟦OPR⟧^{\wedge}0.275]*[1-3*⟦(\sigma-0.6)⟧^{\wedge}2]}$ wherein the DPI is in the range of 1.001-2.201.

The turbine engine of any preceding clause, wherein: 1.217≤DPI≤2.201; 0.2≤$\sigma$≤0.8; 0.8≤DPFR≤2.0; 20≤OPR≤60; 0.9≤CRR≤1.3; and N=2.

The turbine engine of any preceding clause, wherein: 1.001≤DPI≤1.1; 0.4≤$\sigma$≤0.6; DPFR=2; 20≤OPR≤30; 1.0≤CRR≤1.2; and N=1.

The turbine engine of any preceding clause, wherein the OPR is determined based on a rated thrust of the turbine engine. of an axial chord length of a first stage vane to a circumferential spacing between adjacent vanes of the first stage turbine nozzle.

The turbine engine of any preceding clause, wherein at least one vane in the first stage turbine nozzle has a different axial chord length than other vanes in the first stage turbine nozzle.

The turbine engine of any preceding clause, wherein the axial chord length for the first stage turbine nozzle is calculated as a representative axial chord length for the vanes of the first stage turbine nozzle.

The turbine engine of any preceding clause, wherein the representative axial chord length for the first stage turbine nozzle is calculated based on an average axial chord length for the vanes in the first stage turbine nozzle.

The turbine engine of any preceding clause, wherein the first stage turbine nozzle includes a non-constant circumferential spacing between adjacent vanes.

The turbine engine of any preceding clause, wherein a circumferential spacing between adjacent vanes of the first stage turbine nozzle is determined as a representative pitch for the first stage turbine nozzle.

The turbine engine of any preceding clause, wherein the representative pitch for the first stage turbine nozzle is determined by determining a radial mid-point of each of the vanes along a respective leading edge, determining a radial mid-point circumference of the first stage turbine nozzle defined by the determined radial mid-points of the vanes, and dividing the determined radial mid-point circumference by the number of turbine vanes in the first stage turbine nozzle.

The turbine engine of any preceding clause, wherein the NOx Dp/Foo of the predecessor turbine engine is indicated in an International Civil Aviation Organization (ICAO) Aircraft Engine Emissions Databank.

The turbine engine of any preceding clause, wherein the OPR is defined at a predetermined static thrust of the turbine engine.

The turbine engine of any preceding clause, wherein the predetermined static thrust is a nameplate rated thrust of the turbine engine.

The turbine engine of any preceding clause, wherein the radius Rt defined by the first turbine stage is based on a distance from a blade hub of the first turbine stage to the engine centerline.

The turbine engine of any preceding clause, wherein the radius Rc defined by the last compressor stage is based on a distance from a blade hub of the last compressor stage to the engine centerline.

We claim:

1. A turbine engine comprising:
   a core including a fan section, a compressor section, a combustion section, and a turbine section in serial flow arrangement, the core defining an engine centerline;
   the compressor section including a set of compressor stages, the set of compressor stages including a first compressor stage and a last compressor stage, each of the set of compressor stages comprising a pair of non-rotating vanes and rotating blades, wherein an overall pressure ratio (OPR) defined as a ratio of a total pressure immediately downstream of the last compressor stage to a total pressure immediately upstream of an inlet of the fan section, wherein the OPR is in a range of 20-60;

the turbine section including a set of turbine stages having a number of turbine stages (N) in a range of 1-2, each turbine stage comprising pairs of non-rotating vanes and rotating blades, wherein a set of vanes defines a nozzle, and wherein a first stage turbine nozzle is closest to the combustion section;

wherein the first stage turbine nozzle has a solidity ($\sigma$) defined as a ratio of a representative axial chord length for the first stage turbine nozzle to a representative circumferential spacing between adjacent vanes of the first stage turbine nozzle, wherein the solidity is in a range of 0.2-0.8;

wherein the turbine engine has a Nox Dp/Foo ratio (DPFR) defined as a ratio of a Nox Dp/Foo of a predecessor turbine engine to a Nox Dp/Foo of the turbine engine, wherein the DPFR is in a range of 0.8-2.0;

wherein the turbine section and compressor section define a core radius ratio (CRR), the CRR defined as a ratio of Rt/Rc, where Rt is a radius defined by the first turbine stage and Rc is a radius defined by the last compressor stage, wherein the CRR is in a range of 0.9-1.3; and wherein the first stage turbine nozzle having a durability and performance index (DPI) defined as:

$$DPI = \sqrt{[CRR*DPFR/\sigma]} * \left[\frac{1.275*N}{OPR^{0.275}}\right] * \left[1 - 3*(\sigma - 0.6)^2\right]$$

wherein the DPI is in the range of 1.001-2.201.

2. The turbine engine of claim 1, wherein:
1.217≤DPI≤2.201;
and
N=2.

3. The turbine engine of claim 1, wherein:
1.001≤DPI≤1.1;
0.4≤σ≤0.6;
1.8≤DPFR≤2;
20≤OPR≤30;
1.0≤CRR≤1.2; and
N=1.

4. The turbine engine of claim 1, wherein the OPR is determined based on a rated thrust of the turbine engine.

5. The turbine engine of claim 1, wherein at least one vane in the first stage turbine nozzle has a different axial chord length than other vanes in the first stage turbine nozzle.

6. The turbine engine of claim 1, wherein the representative axial chord length for the first stage turbine nozzle is calculated based on an average axial chord length for the vanes in the first stage turbine nozzle.

7. The turbine engine of claim 1, wherein the circumferential pacing between adjacent vanes of the first stage turbine nozzle is a non-constant circumferential spacing.

8. The turbine engine of claim 1, wherein the representative circumferential spacing between adjacent vanes for the first stage turbine nozzle is determined by determining a radial mid-point of each of the vanes in the first stage turbine nozzle along a respective leading edge, determining a radial mid-point circumference of the first stage turbine nozzle defined by the determined radial mid-points of the vanes in the first stage turbine nozzle, and dividing the determined radial mid-point circumference by the number of vanes in the first stage turbine nozzle.

9. The turbine engine of claim 1, wherein the NOx Dp/Foo of the predecessor turbine engine is indicated in an International Civil Aviation Organization (ICAO) Aircraft Engine Emissions Databank.

10. The turbine engine of claim 1, wherein the OPR is defined at a predetermined static thrust of the turbine engine.

11. The turbine engine of claim 10, wherein the predetermined static thrust is a nameplate rated thrust of the turbine engine.

12. The turbine engine of claim 1, wherein the radius Rt defined by the first turbine stage is based on a distance from a blade hub of the first turbine stage to the engine centerline.

13. The turbine engine of claim 1, wherein the radius Rc defined by the last compressor stage is based on a distance from a blade hub of the last compressor stage to the engine centerline.

14. The turbine engine of claim 1, wherein the respective chord lengths of the vanes in the first stage turbine nozzle are the same with respect to each other.

15. The turbine engine of claim 1, wherein the circumferential spacing between adjacent vanes of the first stage turbine nozzle is constant throughout the first stage turbine nozzle.

16. The turbine engine of claim 1, wherein at least one vane in the first stage turbine nozzle defines a set of inlet passages fluidly coupled with a cooling supply conduit disposed within the at least one vane.

17. The turbine engine of claim 16, wherein the set of inlet passages is arranged in fluid communication with a fluid flow.

18. The turbine engine of claim 16, wherein at least one vane in the first stage turbine nozzle includes an outer wall defining a set of cooling holes therethrough.

19. The turbine engine of claim 18, wherein each cooling hole is fluidly coupled to the set of inlet passages.

20. The turbine engine of claim 1, wherein the Nox Dp/Foo of the turbine engine is less than the Nox Dp/Foo of the predecessor turbine engine.

* * * * *